Figures 1, 2:
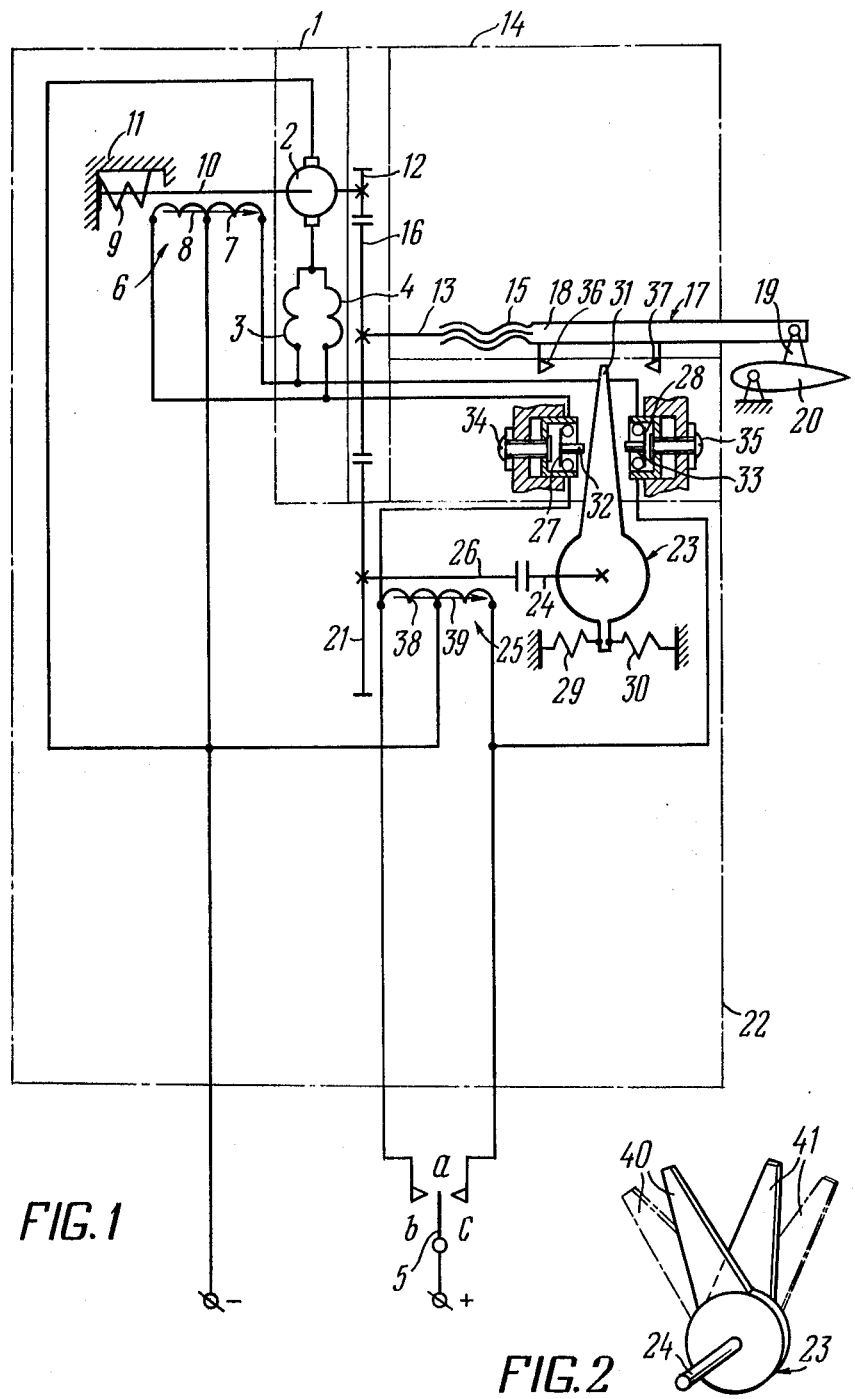

United States Patent [19]

Ryzhko et al.

[11] 4,079,902
[45] Mar. 21, 1978

[54] AIRCRAFT CONTROL SURFACE ACTUATOR

[76] Inventors: Vyacheslav Fedorovich Ryzhko, ulitsa Goncharova, 4, kv. 1; Vladimir Petrovich Krasutsky, ulitsa Kotovskogo, 26, kv. 13; Pavel Stepanovich Kotenko, ulitsa Romena Rollona, 18a, kv. 56; Gennady Pavlovich Staritsky, ulitsa Deputatskaya, 17/6, kv. 9, all of Kiev, U.S.S.R.

[21] Appl. No.: 788,597

[22] Filed: Apr. 18, 1977

[51] Int. Cl.² .............................................. B64C 13/50
[52] U.S. Cl. ............................... 244/75 R; 244/83 R; 318/470; 318/626
[58] Field of Search ............ 244/213, 214, 215, 75 R, 244/228, 236, 231; 318/265, 266, 466, 467, 468, 470, 489, 626; 74/126

[56] References Cited

U.S. PATENT DOCUMENTS

| | | | |
|---|---|---|---|
| 1,342,915 | 6/1920 | Johnson | 318/470 X |
| 2,174,275 | 9/1939 | Raney | 318/470 X |
| 2,654,061 | 9/1953 | Gille | 318/468 X |
| 2,663,001 | 12/1953 | Rusler et al. | 318/470 X |
| 2,809,736 | 10/1957 | Hoover | 244/215 |
| 2,888,626 | 5/1959 | Macoy et al. | 318/470 |
| 3,097,278 | 7/1963 | Alderman | 74/126 X |
| 3,277,356 | 10/1966 | Kraft et al. | 318/470 X |
| 4,032,087 | 6/1977 | Cleaves | 244/218 |

*Primary Examiner*—Galen L. Barefoot
*Attorney, Agent, or Firm*—Lackenbach, Lilling & Siegel

[57] ABSTRACT

An aircraft steering surface actuator has an electric motor, a reduction gear and a step-by-step control mechanism in the form of a cam-operated breaker in the electric motor power supply circuit. The breaker automatically deenergizes the electric motor when the steering surface is turned through one step, thus preventing the steering surface from inadvertent movement to the extreme position in case of trouble in the system.

3 Claims, 2 Drawing Figures

AIRCRAFT CONTROL SURFACE ACTUATOR

The invention relates to the electromechanical equipment of aircraft, and specifically to aircraft steering surface actuators.

Aircraft steering surfaces, as understood herein, are such movable aerodynamic surfaces as tabs, flaps, and movable stabilizers of airplanes, helicopters, autogiros, screen planes, airships and other aircraft.

The majority of currently used electric actuators of the steering surfaces of aircraft, specifically, of tabs, movable stabilizers, flaps and other aerodynamic surfaces, are similar in design and comprise, as a rule, an electric motor connected via a reduction gear and an extensible rod to a bracket on the controlled surface. Remote control of such actuators is effected from the pilot's cabin by supplying current of one or the other polarity to the reversible motor. The motor is operated by closing the contacts in the power supply circuit. The pilot is expected to set the duration of the current pulse supplied to the motor so that the steering surface should turn through the given angle. Naturally, this complicates piloting. Moreover, such a control pattern does not rule out an accidental operation of the electric mechanisms in the extreme position in case of jamming of the control button or of short-circuiting in the motor power supply line. The inadvertent movement of the steering surface toward the extreme position, in combination with the suddenness factor, is extremely hazardous and may lead to an emergency situation not only during takeoff and landing but also during a horizontal flight.

Attempts have been made to develop such actuators in which the inadvertent movement of control surfaces would be interrupted in case of fault in the power supply circuit.

Specifically, there is a prior art device for actuating aircraft units, which employs a follow-up system which provides for compensation of the electric motor rotor torque in case of failure of one of its control circuits (see French Pat. No. 2,070,549).

However, follow-up systems are practically not used in the actuators aircraft auxiliary steering surfaces, since their servomotors are operable only within a rotor angle rotation of 0° to 360°, which would prevent them from being used with reduction gears. Besides, increasing their capacity for building up an effort sufficient for turning a steering surface is associated with an excessive increase of their size and thus is impractical. The described arrangement calls for considerable size and high power ratings of the servomotor to compensate for the rotor torque in case of a failure of one of the control circuits.

As compared with other prior art arrangements for electric control of tabs, flaps, movable stabilizers and other aerodynamic surfaces, the most safe for flight operations is the step-by-step electric actuator made in accordance with the USSR Inventor's Certificate No. 158,804.

The last mentioned aircraft steering surface actuator comprises a reversible DC electric motor; a reduction gear operatively connected with the shaft thereof, which converts the rotary motion of the shaft into either translation or rotation of the output element joined to the steering-surface bracket; and a mechanism for step-by-step control of the motion of the reduction gear output element, e.g., a piston rod. The step-by-step control mechanism has a breaker contact wired into the electric motor power supply circuit and adapted to be engaged by a spring-loaded cam, which is kinematically connected with the reduction gear through an electromagnet clutch. The breaker is in fact an end switch included into the rotor winding supply circuit and positioned to one side of the neutral position of the cam.

The empolyment of such a step-by-step electric control mechanism for the tab actuator enables division of the entire tab movement range into a number of steps (stages). Upon the tab reaching each successive stage the cam breaks the electric motor rotor winding circuit, and the rotation of the steering surface ceases. The electromagnetic clutch retains the cam in this position until the pilot deenergizes the entire actuating circuit by returning the toggle switch to neutral. For a further turning of the tab the actuating circuit must be closed again. This procedure should be followed, as stated above, because by reason of such arrangement, in case of damaged wire insulation, shorted control and lighting electric circuits, breakage or jamming of the control elements, etc., the tab is moved through one step only (±1.5° to 2°), the latter step being of such magnitude as to insignificantly increase the effort on the control levers and thus can be readily compensated for by the pilot. In this case the electric actuator is automatically switched off.

Despite all the obvious advantages, the electric step-by-step actuator is of a considerable size and weight and its design is unjustifiably complicated.

Thus, for example, the breaker drive cam must be provided with a converter of the reversible motion of the motor into unidirectional (during a power stroke) rotation of the cam. The reversible motion converter contains three bevel gears and two overrunning clutches which, although performing an auxiliary function, reduces the reliability of the actuator as a whole.

To switch off the electric motor in the extreme positions the actuator includes a set of cam plates fitted on one shaft to interact with limit switches in the electric motor power supply circuit. This unit is bulky and must be assembled in precise timing with the breaker cam of the step-by-step control mechanism.

As is known, tab actuators are installed in the aircraft within the structures of comparatively thin principal steering surfaces, and for this reason their size and weight should be as low as practicable.

The failure probability of mechanical and electrical devices is, as a rule, directly proportional to the number of component parts and of their articulations; therefore any complication of the design in the majority of cases leads to reduced reliability.

It is an object of the present invention to provide an aircraft steering surface actuator, wherein the step-by-step control during the reversing of the electromotor should be effected without converting the reversing motion of the electromotor shaft into unidirectional rotary motion of the cam.

It is another object of the invention to provide an aircraft steering surface actuator, wherein the functions of the mechanism for the step-by-step control and those of a limiting device of the steering surface extreme positions should be combined.

It is another important object of the invention to provide an adjustable aircraft steering surface actuator which should enable variation of the pitch (step) of the steering surface motion.

To achieve these and other objects of this invention, there is provided an aircraft control surface actuator comprising an electric motor; a reduction gear connected with the shaft thereof and converting the rotary motion of the shaft into either translatory or rotary motion of the output element connected with a steering surface bracket; and a step-by-step control mechanism supervising the reduction gear output element motion. The control mechanism including a circuit breaker connected into the electric motor power supply circuit, the breaker periodically interacting with a spring-loaded cam which is drivingly connected with the reduction gear through an electromagnetic clutch. The breaker is composed of two limit switches included in the power supply circuits of the electric motor excitation windings, the limit switches being arranged on both sides of the neutral or normal position of the cam.

An advantage of the proposed actuator is that it provides for step-by-step control of the steering surface, while being simple in design and of a small size and weight.

Moreover, this simple operative connection of the motor with the breaker cam reduces the probability of a mechanism failure which in mechanical and electrical devices is as a rule in proportion to the number of component parts and their interconnections.

It is obvious that the small size of the actuator enables accommodation of it in the structure of any principal steering surface.

It is advisable that the cam should be made as a spring loaded lever mounted on the shaft and that lugs should be installed on the reduction gear output element for interaction with the cam when the steering surface reaches its extreme positions.

The above arrangement makes it possible to combine the functions of a step-by-step control mechanism and of a limiter of the steering surface extreme positions. This is achieved by making the cam in the form of a lever.

It is advisable that the limit switches should be mounted so that the distance between them can be adjusted. Such arrangement provides for the pitch (step) of the steering surface motion being adjustable.

The invention will now be explained in greater detail in connection with embodiments thereof, with reference being had to the accompanying drawings in which:

FIG. 1 is a diagrammatic representation of the aircraft steering surface actuator according to the invention; and FIG. 2 is a perspective view of the extensible cam of the breaker of the step-by-step control mechanism of the aircraft steering surface actuator, according to an alternative embodiment of the invention.

The aircraft steering surface actuator of the present invention illustrated in FIG. 1 comprises an electric motor 1, with one of its rotor windings 2 and two excitation windings 3 and 4 connected to the power supply circuit. The excitation windings 3 and 4 are connected with the power supply circuit via a single-pole three-position switch 5 which makes it possible to selectively connect either one of them and thus to reverse the electric motor 1. The said single-pole switch 5 has three positions, namely one neutral "a" and two end positions "b" and "c".

The actuator is fitted with an electromagnetic brake 6 of which the winding 7 is connected to the power supply circuit through the single pole switch 5 in parallel with the electric motor 1.

The core 8 of the brake 6 is loaded by a coil spring 9 and is so positioned that it can interact with the shaft 10 of the electric motor 1 and be connected rigidly with the housing 11 of the actuator during the translatory motion.

The shaft 10 of the electric motor 1 is operatively connected by means of a gear 12 with the input shaft 13 of the reduction gear 14. The reduction gear 14 is provided with a lead screw-nut couple 15 for convertion of the rotary motion of the gear 16 into translatory motion of the output element 17 (a rod 18 in the present embodiment). The rod 18 of the reduction gear 14 is pivoted on the bracket 19 of the aircraft steering surface 20.

The electric motor 1 through the gears 12, 16 and 21 is drivingly connected with the mechanism 22 adapted for step-by-step control of the motion of the output element 17. The said step-by-step control mechanism 22 comprises a circuit breaker cut into the power supply circuit of the electric motor 1 and a cam 23 periodically interacting therewith, the shaft 24 of the cam 23 being connected via an electromagnetic clutch 25 with the shaft 26 of the gear 21. According to the invention, the breaker is composed of two normally closed limit switches 27 and 28 in the power supply circuits of the excitation windings 3 and 4 of the electric motor 1. Thus, the limit switch 27 is wired serially into the circuit between the single pole switch 5 and the excitation winding 4, and the limit switch 28 is respectively wired into the circuit between the single pole switch 5 and the excitation winding 3. According to the invention, the limit switches 27 and 28 are arranged on both sides of the neutral position of the cam 23. The cam 23 is fitted with a means for setting it into a neutral position with respect to the limit switches 27 and 28. Specifically, in the neutral position it is retained by springs 29 and 30. According to the invention, the cam is made in the form of a lever 31 mounted on the shaft 24. The limit switches 27 and 28 are situated on both sides of one of the arms of the lever 31 so that their depressable elements 32 and 33 are normal to the lever 31 and are indexed in the plane of rotation of the lever about the shaft 24. Provisions are made for adjustment of the distance between the limit switches 27 and 28 with the aid of set screws 34 and 35, to vary the control pitch or step of the step-by-step actuator.

The output element 17 of the reduction gear 14 is equipped with lugs 36 and 37 which define the extreme positions of the aircraft steering surface and which are engaged by the lever 31 at the end of its stroke for switching off the electric motor 1.

The electromagnetic clutch 25 has two windings 38 and 39 connected with the single pole switch 5. The winding 38 is connected in parallel with the power supply circuit of the excitation winding 4 ahead of the limit switch 27 of the breaker. The winding 39 is similarly connected to the power supply circuit of the other excitation winding 3 of the electric motor 1. Therefore, one of the windings 38 or 39 is positively energized when the said switch 5 is put into either one of its end positions "b" or "c."

While the preferred embodiment of the present invention has been described and illustrated above, it is to be understood that various changes relating to the shape, dimensions and arrangement of parts can be made within the scope and spirit of the invention as defined in the appended claims. Other alternative embodiments within the scope of the present invention can be proposed. For example, according to another embodiment the cam 23 is made of two parts 40 and 41 fitted on one shaft 24 and movable with respect to each other in the plane of rotation, as is illustrated in FIG. 2. Such arrangement of the cam 23 provides for varying the pitch of the step-by-step control without changing the position of the limit switches 27 and 28.

The aircraft steering surface actuator operates in the following manner.

When the single pole switch 5 is moved from the neutral position "a" into position "b" (extension) power is supplied through the normally closed limit switch 27 to the excitation winding 4 and to the winding 2 of the rotor of the electric motor 1. Simultaneously, power is supplied by way of the same circuit to the winding 7 of the electromagnetic brake 6 and to the winding 38 of the electromagnetic clutch 25. The core 8 of the electromagnetic brake 6 is driven through translatory motion and overcomes the resistance of the spring 9, disengaging the shaft 10 of the electric motor 1 from the actuator housing 11. The electromagnetic clutch 25 engages the shaft 26 of the gear 21 with the shaft 24 of the cam 25. The electric motor 1 starts driving the gear 12 and the input shaft 13 of the reduction gear 14, the said input shaft 13 being connected with the said gear 12. The lead screw-nut couple 15 of the reduction gear 14 converts the rotary motion of the input shaft 13 into translatory motion of the output element 17, i.e., into translatory motion of the rod 18. Therefore, the motion of the rod 18 of the reduction gear 14 acts upon the bracket 19 of the aircraft steering surface 20 and turns it with respect to its initial position.

Simultaneously, rotary motion through the gear 21 and electromagnetic clutch 25 is imparted to the cam 23 which rotates from its neutral position towards the limit switch 27. Upon engaging the depressable element 32 of the limit switch 27, the cam 23 moves the said element 32, thus breaking the power supply circuit of the electric motor 1. The rotation of the steering surface 20 ceases, and the power supply to the winding 7 of the electromagnetic brake 6 is discontinued. The core 8 of the electromagnetic brake 6 is displaced under pressure from the spring 9 and engages the shaft 10 of the electric motor 1 to engage the shaft with the actuator housing 11. Owing to this, the steering surface 20 operatively connected with the shaft 10 of the electric motor 1 also becomes fixed in a position turned through one step. Upon deenergization of the electric motor 1, the winding 38 remains energized, and the electromagnetic clutch 25 holds the cam 23 in the turned position until the operator sets the switch 5 to the neutral position "a."

To rotate the steering surface 20 through the next step, the switch 5 must be first set to the position "a" then again to the position "b." With the switch 5 shifted to the position "a," the power supply circuit of the winding 38 of the electromagnetic clutch 25 breaks. The electromagnetic clutch 25 disconnects the shaft 26 of the gear 21 from the shaft 24, thus interrupting the connection of the cam 23 with the braked shaft 10 of the electric motor 1. The springs 29 and 30 return the cam 23 to the neutral position, and the limit switch 27 again assumes the original normally closed state. When the switch 5 is once again set to the position "b" for a further turn of the steering surface 20, the actuator will again operate through one step, as it has been described above.

When in the process of its further step-by-step rotation steering surface 20 reaches its extreme position, the lug 37, interacting with the lever 31 of the cam 23, will turn the latter towards the limit switch 27. The normally closed limit switch 27 under the action of the cam 23 will break the power supply circuit of the winding 4 of the electric motor 1. The spring 9 will shift the core 8 of the electromagnetic brake 6 which will lock the shaft 10 and the steering surface 20 operatively connected therewith in this position.

The steering surface 20 can be turned in the opposite direction by setting the switch 5 initially to the position "c." In this case power will be fed through the normally closed limit switch 28 to the excitation winding 3 of the electric motor 1. For additional steps, the actuator operates as explained above.

The step, i.e., the angle through which the control surface 20 rotates when the switch 5 is set to the position "b" or "c," as well as the number of steps between the extreme positions, can be adjusted by varying the distance between the limit switches 27 and 28 with the aid of the set screws 34 and 35. For example, when the limit switches 27 and 28 are set closer together, the angle of rotation of the cam 23 required for depressing the limit switches 27 and 28 becomes less, same as the stroke of the rod 18 of the reduction gear 14, the stroke corresponding to one step, while the number of steps between the extreme positions of the steering surface 20 increases.

Alternatively, the step (pitch) can be adjusted by turning the two parts 40 and 41 of the cam 23 relative to each other, as is shown by dot-and-dash lines in FIG. 2.

An advantage of the aircraft steering surface actuator disclosed herein as compared with prior art actuators for step-by-step control of steering surfaces lies in that it is simpler in design, is of smaller weight and size and is more reliable in operation.

What is claimed is:

1. An aircraft steering surface actuator for step-by-step movement of said surface comprising:
   an electric motor having
   a power supply circuit,
   a winding of a rotor wired into said power supply circuit, and
   two excitation windings wired into the power supply circuit;
   a switch for selective connection of either one of said excitation windings to said power supply circuit for reversing said electric motor;
   a reduction gear having an input shaft operatively connected with said electric motor;
   an output element of said reduction gear connected with the steering surface to move the steering surface during flight control;
   means for step-by-step control of said electric motor having
   a breaker connected into said power supply circuit of said electric motor for deenergization thereof when said steering surface has moved through one step,
   said breaker including two limit switches connected into the power supply circuits of said excitation windings of the electric motor,
   a cam operatively connected with said electric motor and arranged to alternatively engage said limit switches,
   a means for setting said cam to a neutral position with respect to said limit switches, and an electromagnetic clutch which connects said cam with said electric motor, a winding of said electromagnetic clutch being included in the power supply circuit through said switch for selective connection of the excitation windings.

2. An aircraft steering surface actuator according to claim 1 wherein said cam is made in the form of a spring-loaded lever mounted on a shaft, and lugs are arranged in the plane of rotation of said lever on the output element of the reduction gear for interaction with the cam when the steering surface reaches an extreme position.

3. An actuator according to claim 1 wherein said limit switches are installed so that the distance between them can be adjusted.

* * * * *